United States Patent [19]
Bacon

[11] 4,280,144
[45] Jul. 21, 1981

[54] COARSE SCAN/FINE PRINT ALGORITHM
[75] Inventor: James L. Bacon, Lexington, Ky.
[73] Assignee: International Business Machines Corporation, Armonk, N.Y.
[21] Appl. No.: 99,370
[22] Filed: Dec. 3, 1979
[51] Int. Cl.³ .......................................... H04N 1/40
[52] U.S. Cl. ................................. 358/280; 358/138; 358/283; 364/515
[58] Field of Search ............... 358/280, 283, 260, 138, 358/261; 364/515

[56] References Cited
U.S. PATENT DOCUMENTS

| | | | |
|---|---|---|---|
| 3,294,896 | 12/1966 | Young | 358/283 |
| 3,573,789 | 4/1971 | Sharp | 340/146.3 H |
| 3,739,082 | 6/1973 | Lippel | 358/138 |
| 3,916,096 | 10/1975 | Everett | 358/283 |
| 4,032,977 | 6/1977 | Liao | 358/280 |
| 4,124,870 | 11/1978 | Schatz | 358/260 |
| 4,150,400 | 4/1979 | Wong | 358/261 |
| 4,184,206 | 1/1980 | Harano | 364/515 |
| 4,205,341 | 5/1980 | Mitsuya | 358/260 |

Primary Examiner—Howard Britton
Attorney, Agent, or Firm—Joscelyn G. Cockburn

[57] ABSTRACT

An apparatus and method for improving the print quality of a coarse scan/fine print image processing device. The apparatus includes an encoder which assigns a code to a coarsely scanned picture element (PEL). The assigned code is representative of the reflectance characteristic of the PEL. For fine reproduction of coarsely scanned data, the coarsely scanned PEL is summed with at least four adjacent horizontal and vertical PELs to reproduce a fine PEL comprising of at least four subelements.

16 Claims, 14 Drawing Figures

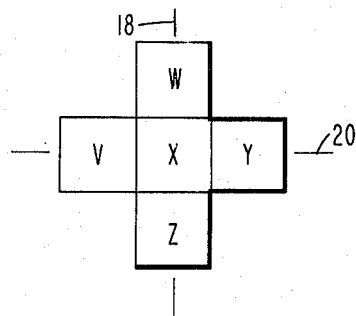
FIG. 2    FIG. 3
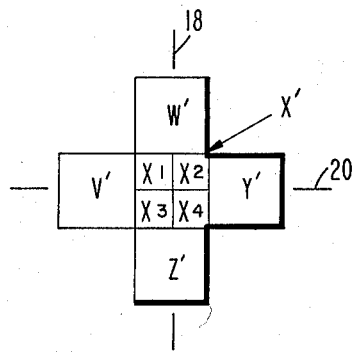
FIG. 4
TABLE
0 0 0 0
0 0 0 1
0 0 1 0
0 0 1 1
0 1 0 0    WHITE
―――――――
0 1 0 1    BLACK
0 1 1 0
0 1 1 1
1 0 0 0
1 0 0 1
FIG. 5

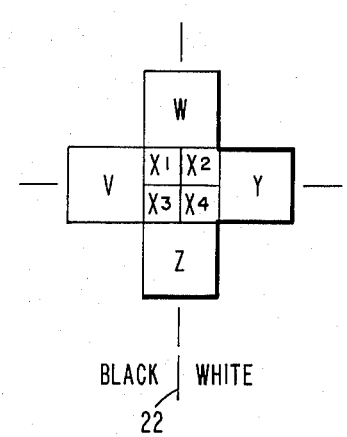
BLACK | WHITE
  22
FIG. 6a
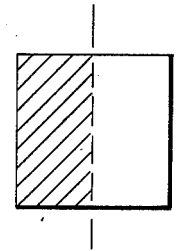
FIG. 6b
| PEL | CODE |
|-----|------|
| V | 1 1 |
| W | 1 0 |
| X | 1 0 |
| Y | 0 0 |
| Z | 1 0 |
FIG. 7

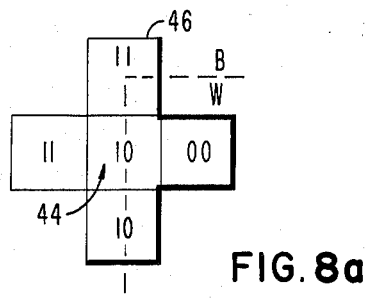
FIG. 8a
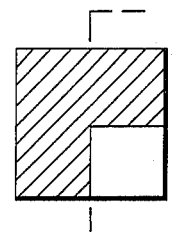
FIG. 8b
FIG. 9
| $X_1$ | $X_2$ | $X_3$ | $X_4$ (PEL) |
|---|---|---|---|
| 11 | 11 | 11 | 00 |
| 11 | 00 | 10 | 10 |
| 110 | 11 | 101 | 10 |
| 10 | 10 | 10 | 10 |
| 1000 | 0101 | 0111 | 100 |
| (B) | (B) | (B) | (W) |
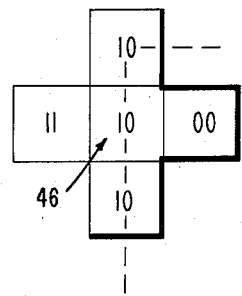
FIG. 10a
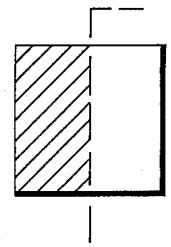
FIG. 10b
FIG. 11
| $X_1$ | $X_2$ | $X_3$ | $X_4$ |
|---|---|---|---|
| 11 | 10 | 11 | 00 |
| 10 | 10 | 10 | 10 |
| 101 | 100 | 101 | 10 |
| 10 | | 10 | 10 |
| 111 | | 111 | 100 |
| (B) | (W) | (B) | (W) |

COARSE SCAN/FINE PRINT ALGORITHM

BACKGROUND OF THE INVENTION

1. Field of the Invention

The invention relates generally to image processing methods and apparatus and more particularly, to the method and apparatus used for processing coarse scan/fine print data.

2. Description of the Prior Art

The scanning binary encoding, compression, transmission and reproduction of data is well known in the prior art. Prior art image processing devices which perform the enumerated functions are affected by at least two almost irreconcilable factors, namely: resolution and device cost. Any attempt to improve one factor appears to adversely affect the other factor and vice versa. The resolution of an image processing device refers to the fidelity with which a copy of an original document (such as textual and/or continuous tone material) is reproduced. In the prior art, the reproduction of high fidelity copies require elaborate high cost electronic gadgets which augment the overall system cost.

Several devices and methods have been used in the prior art to reconcile the disparity between high fidelity reproduction and cost. One of such prior art methods is the so-called coarse-scan/coarse-print method. Generally, the images and/or data are coarsely scanned and coarsely printed. In other words there is a 1:1 resolution between an original document and a reproduced copy. It is worthwhile noting at this point, that the amount of data generated from a document to be reproduced is directly dependent on the relative coarseness with which the document is scanned. As such, the coarser a document is scanned, the lesser amount of data will have to be processed (i.e. digitized, encoded etc.) for transmission to a reproducing device. Since the volume of data is relatively small, the cost of the system is relatively low.

Conversely, coarse-scan/coarse-print documents are often of poor quality, primarily because the amount of data generated from the coarsely scanned document is insufficient to reproduce the same.

Coarseness generally refers to the number of picture elements (PELs) per unit area. Therefore, the coarser the scanning of a document, the lesser amount of data is available regarding the contents of the document. In a system wherein the resolution ratio is 1:1, the reproduced copy is no better than the degree of coarseness with which the original document is being scanned. In fact, the resolution ratio of the reproduced copy is often less than one due to degradation of the data during processing and transmission. The net result is that although the cost of the coarse-scan/coarse-print system is relatively low, the quality of the reproduced copy is poor.

Another prior art method is the so-called fine-scan/fine-print method. In this method a fine-scanned device is used to scan the document and a fine-reproduction device is used to print the reproduced copy. Usually a document is finely scanned if the document is scanned at approximately 720 PELs per inch. Likewise, the document is finely printed if it is reproduced at about 720 PELs per inch. Although this method produces high quality reproductions of original documents, the system cost is relatively high. The high cost stems from the fact that a large amount of data has to be processed and transmitted to the reproducing device.

Still another method used in the prior art to reconcile cost and picture quality in facsimile devices or image processing devices is the so-called coarse-scan/print-fine method. In this method the document is coarsely scanned and finely printed. In other words, the resolution ratio of the reproduced copy is different from the resolution ratio with which the original document is scanned. Usually, the resolution ratio of the copy is greater than the resolution ratio of the original, for example, 1:N (where N is greater than 1).

U.S. Pat. No. 3,573,789 is one example of prior art coarse-scan/print-fine devices. The subject patent teaches an apparatus and method for expanding the resolution of data images. The method expands each data bit which was assigned a physical area in the image to be displayed into a plurality of data bits which are still associated with the same physical area of the image to be displayed. The expansion of data bits is obtained by comparing each data bit with its surrounding eight data bits. If the original data bit signified that the area was to be displayed, then the area will still be displayed. If the original data bit signified that the area was not to be displayed, then one or more of the newly generated plurality of data bits will be displayed as a function of the surrounding eight data bits within the original data image.

U.S. Pat. No. 4,032,977 exemplifies a prior art device wherein grey scale information is used to expand the resolution of a reproduced document. The patent discloses an interpolator which predicts a grey scale value for each picture element (PEL) of video output data on the basis of the quantized levels of an m × n metrix video input data elements. The interpolator is constructed in accordance with a predetermined probabilistic information to carry out a maximum likelihood estimation process so that the grey scale information is introduced with minimum statistical errors.

U.S. Pat. No. 4,124,870 is yet another example of prior art devices wherein coarsely scanned data is finely printed by utilizing grey scale information. According to this method, eight sums are obtained of various groups of three, peripheral PELs surrounding the PEL to be reproduced. The peripheral PELs are located symmetrically (i.e. on both sides of bisecting lines, vertical, horizontal and two 45° lines) with respect to the PEL to be reproduced. A particular matrix of print dot placement is selected from a prestored group of print dot patterns. The selected pattern becomes the model from which the data is finely reproduced. The matrix of print dot placement is selected according to the largest pattern sum of the eight possible cases.

Although the above-described coarse-scan/print-fine device shows a definite improvement over either the fine-scan/print-fine or the coarse-scan/coarse-print devices, the cost of the coarse-scan/fine-print device appears to be still relatively high. Among the factors which tend to augment the cost of the device is the use and/or processing and transmission of unnecessary grey scale information to reconstruct the reproduced document. Of course, there will have to be a trade-off between cost and quality, however, one does not have to sacrifice cost for quality or vice versa. In fact, the present invention discloses a scan-coarse/fine-print device for reproducing high quality print at relatively low cost.

SUMMARY OF THE INVENTION

It is, therefore, the primary object of the present invention to provide an apparatus and method whereby high quality copies of original documents are reproduced.

It is an object of the present invention to reproduce a fine print of a coarsely scanned document from less transmitted information than has heretofore been possible.

It is yet another object to reproduce high quality copies at relatively low cost.

The method uses the coarse-scanned grey level information to reproduce a finely printed copy of a coarsely scanned original document. A coarsely scanned PEL is assigned a grey scale code. The assigned code indicates the reflectance characteristics of the PEL. In other words, each coarse scanned PEL is encoded as to the grey scale area in which it fails. The grey scale code is then transmitted to the reproducing device (such as an ink jet printer, wire matrix printer, cathode ray tube, etc.). The reproducing device, on receiving a PEL to be reproduced (hereinafter called the PEL of interest) generates four sums of three-grouped PELs. Each group of PELs include the PEL of interest and immediate surrounding PELs all lying on a pair of perpendicular lines. Each sum of PELs is weighted against a decision scale to generate a print/no-print decision. The four sums are used to replace the PEL of interest.

In one embodiment of the invention, the original document is scanned at X resolution; transmitted at 2X resolution and printed at 4X resolution.

The apparatus for performing the above-enumerated process includes a transmitter and a receiver. A transmission channel interconnects the transmitter and the receiver.

The transmitter includes a scanner which scans the document and outputs a video signal indicative of the informational contents of the document. An encoder assigns a 2-bit binary code to the video signal outputted from each element of the scanner. The code is stored in a storage means and is serially outputted for transmission over the transmission channel. A controller controls the rate at which the original document is scanned and the rate at which the grey scale encoded data is transmitted over the transmission channel.

The receiver includes a modem which receives the data, decodes the same and outputs the data serially on a bit per bit, line by line basis. A two line memory stores at least two successive lines of data. Bits from a third successive line of data are combined in accordance with a predetermined set of mathematical expressions to form four sums. Each new PEL to be reproduced is a combination of the four sums. The bits to be combined are selected by a data selector means, while the bits in the selector are combined by an Arithmetic Logic Unit (ALU) to form the sums. Each sum is compared against a predetermined thresholder to make a print or no-print decision.

The foregoing and other features and advantages of the invention will be apparent from the following more particular description of preferred embodiment of the invention, as illustrated in the accompanying drawings.

BRIEF DESCRIPTION OF THE DRAWINGS

FIG. 2 shows a diagram of the geometrical relationship between a PEL of interest and its surrounding PELs. The diagram is helpful in understanding the method used to select grey scale information to reproduce a PEL.

FIG. 3 shows the range of grey level value within which a PEL may fall.

FIG. 4 is a diagram showing the four PELs combined to form a reproduced PEL.

FIG. 5 shows a threshold table against which each of the sums are compared to form a print no-print decision.

FIG. 6A shows a vertical and horizontal edge example of coarsely scanned PEL.

FIG. 6B shows a fine reproduction of the PEL.

FIG. 7 shows the grey scale code assigned to each of the coarsely scanned PELs of FIG. 6A.

FIG. 8A shows an angle and edge example. In the example, one of the PELs which adjoins the PEL of interest, has a reflectance value greater than 50% and less than 75%.

FIG. 8B shows the reproduced PEL.

FIG. 9 shows a table of calculation for the four sums and the associated print decision.

FIG. 10A shows another angle and edge example. In the example, the adjoining PEL of FIG. 8A has a reflectance between 50% and 75%.

FIG. 10B shows the reproduced PEL.

FIG. 11 shows a table of calculation for the four sums and the associated print decision.

DETAILED DESCRIPTION OF THE PREFERRED EMBODIMENT

Figure 1:
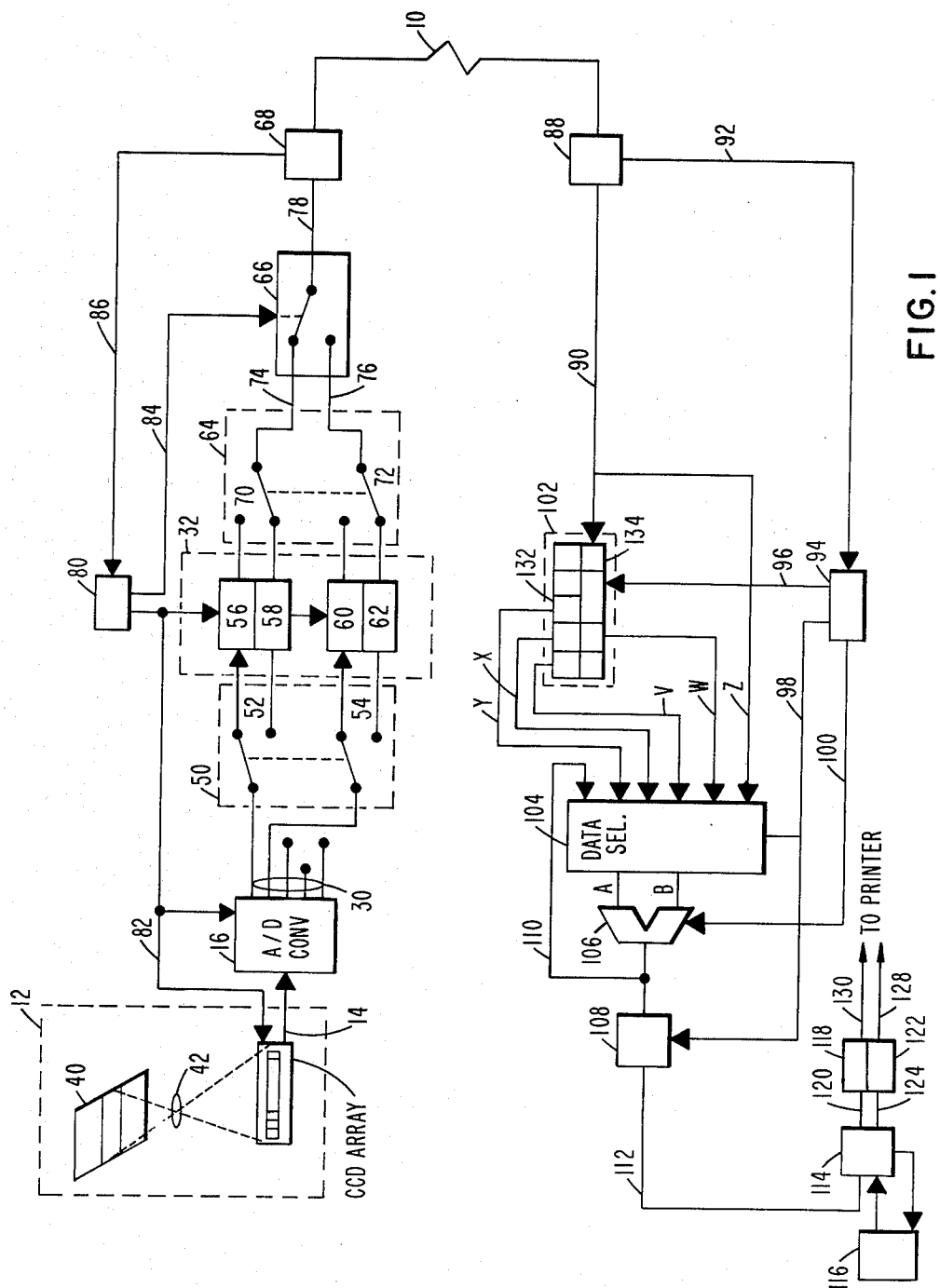
FIG. 1 shows, in block diagram form, an imaging processing apparatus which incorporates the present invention.

Referring to FIG. 1, a device is shown for scanning and encoding the scanned data in accordance with the teaching of the present invention. The scanned data is then transmitted over a communication link 10 (hereinafter called transmission channel 10) to a reproducing device such as an ink jet printer, matrix printer, cathode ray tube, etc. The reproducing device is usually positioned some distance away from the transmitter of the apparatus shown in FIG. 1. It should be noted, however, that the invention which will be described hereinafter is also useful in a system wherein the receiver and reproducing device is connected directly to the transmitter without the use of the transmission channel interconnecting both. In such a configuration, the transmitter and the receiver are interconnected by cables.

In FIG. 1 a document (not shown) to be reproduced is coarsely scanned by scanner 12 and a plurality of video signals are outputted on bus 14. As is used in this application, a document is coarsely scanned if the scanner scans said document between 50 and 200 PELs per inch. The signals on bus 14 are fed into grey scale encoder 16. For each picture element (PEL) outputted on bus 14, the grey scale encoder assigns one of four possible codes to said PEL. Each code is a measure of the grey scale area in which said PEL falls.

The scanner is a conventional one and includes a document platen 40 upon which the original document is placed. Each line of data on the document is projected through lens 42 onto an array of charge coupled device (CCD) which generates the video signal. The array may be of the type manufactured by *Fairchild Industries.* Since the scanner and the CCD array are state of the art devices, a more detailed description will not be given.

Turning to FIG. 2 for the moment, a series of blocks V, Y, W, Z and X are shown arranged about two perpendicular intersecting lines 18 and 20, respectively. The showing is helpful to understand the process used to reproduce a PEL. Each of the squares are representative of a PEL of coarsely scanned data. It should be noted that the actual size of a PEL is within the range of a few millimeters and the showing in FIG. 2 is grossly exaggerated. As will be explained in greater detail hereinafter by positioning PELs V, Y, W and Z on two perpendicular lines, with respect to PEL X, hereinafter referred to as the PEL of interest, said PEL X is reproduced at a higher resolution by taking four sums of the adjoiningg coarsely scanned PEL situated on lines 18 and 20, respectively.

Referring now to FIG. 3 the grey scale code used for encoding each PEL prior to transmission or processing by the reproducing device is shown. The code is assigned based on the reflectance characteristics of the PEL. The graph on the left of the figure shows percentage reflectance or grey scale. As is evident from the graph, zero percentage represents black while 100 percent represents white. As is shown on the grey scale code of FIG. 3 a two-bit code is used to represent PELs having grey scale value between white (100%) to black (0%). By way of example, if the gray scale of a PEL falls between 0% and 25% then a code of 11 would be assigned to said PEL. Likewise if the PEL falls between 25% and 50% a code of 10 is assigned. If the PEL falls between 50% and 75% reflectance then a code of 01 is assigned to the PEL. Finally, if a PEL falls between 75% and 100% reflectance, a code of 00 is assigned to the PEL. With this scheme only two bits are needed for assigning one of four grey scale values to a coarsely scanned PEL. As such, the amount of resources such as processing circuits and transmission lines which are needed to process and transmit grey scale information about a PEL to be reproduced is significantly reduced.

Referring now to FIG. 4, the pattern used to access coarsely scanned PELs, in accordance with the present invention, is shown. In FIG. 4 $V'$, $Y'$, $W'$ and $Z'$ represent the grey scale code which is assigned to each PEL prior to transmission. Stated another way, $V'$ is the grey scale code which is assigned to PEL V. Likewise, $W'$ $Y'$ and $Z'$ are the grey scale codes which is assigned to PEL W, Y and Z respectively. $X'$ represents the grey scale code which is assigned to PEL X in FIG. 2. In order to reproduce PEL X in FIG. 2 with a higher spacial resolution than the scanning resolution, the PEL X is subdivided into four sub-PELs (see FIG. 4) namely, $X_1$, $X_2$, $X_3$ and $X_4$. When the new PEL X hereinafter called the print PEL is reconstructed in accordance with the following algorithm, the resolution of the printed PEL is greater than the resolution at which it was scanned. The algorithm is as follows:

$X_1 = X' + V' + W'$ $X_2 = X' + W' + Y'$ $X_3 = X' + Y' + Z'$ $X_4 = X' + V' + Z'$

The new PEL X called the print PEL to be reproduced, is the sum of four PELs, namely $X_1$, $X_2$, $X_3$ and $X_4$. By scanning the PEL at a first resolution, transmitting a number of binary bits (coded PEL) twice the scanning resolution and constructing the print PEL by summing four adjacent coded PELs, the reproduced PEL, hereinafter called the print PEL, has a higher spatial resolution than that of the scanned PEL.

Stated another way, a document to be reproduced is scanned at a spacial resolution of R PELs/sq. inch. For transmission or processing, a PEL is coded at 2XR bits/sq. inch. The document is reproduced or printed at 4XR PELs/sq. inch.

FIG. 5 shows a scale or thresholder. The grey scale value for X1, X2, X3 and X4, respectively, are compared to determine whether the reproducing apparatus (not shown) should print a binary PEL or not to print a binary PEL on a reproducing media. The scale is a threshold type of scale and is chosen arbitrarily. For example, if a grey scale value falls between 0000 and 0100 then that grey scale value would be assigned a white. This means a no-print decision. Likewise, if the grey scale value falls between 0101 and 1001 then that grey scale value would assign a black. This means a print decision. Of course, it is within the skill of the art to use any other type of conversion algorithm or method to convert the grey scale data to a print or no-print decision without departing from the spirit and scope of the present invention. Once the grey scale value for X1 is ascertained from the above sum algorithm, then the value is compared against the predetermined scale of FIG. 5 and a determination is made as to whether X1 is black or white. Likewise the same procedure is followed for X2, X3 and X4. Before continuing with the description of the image processing device shown in FIG. 1, it is worthwhile giving a few examples of how the aboove enumerated scheme is used to convert a coarsely scanned PEL to print a fine PEL. FIG. 6A shows the geometric relationship with the PELs while FIG. 6B shows the reproduced PEL. Example A is intended to show the reproduction of a vertical and horizontal edge of a PEL. FIG. 7 shows the grey scale code which is assigned to each of the coarsely scanned PELs V, W, X, Y and Z. The left side of vertical line 22 (FIG. 6A) denotes black while the right side of line 22 denotes white. From the above algorithms: $X_1 = 11 + 10 + 10 = 111$. When the value for X1 is compared against the referenced table of FIG. 5, it is seen that $X_1$ is black. Black is denoted by cross-line markings in FIG. 6B. Likewise $X_3 = V + Z + X = 111$. In a similar fashion the value for $X_3$, when compared against the table in FIG. 5, $X_3$ is black. In a like manner $X_2 = X_4 =$ white. As such, the bit X of FIG. 6A was transmitted as all white. However, in the fine reproduction shown in 6B, the PEL is represented as half white and half black. As such, the spacial resolution is increased and more detail is represented in the reproduction of the coarsely scanned PEL.

EXAMPLE B

Example B shows an angle and edge example. In FIG. 8A, the geometric arrangement of the coarsely scanned PEL is shown. The binary values in each box represent the grey scale value code which was assigned to said PEL by the encoder in FIG. 1. The PEL to be reproduced in PEL 44. PEL 44 has a reflectance value greater than 75%. FIG. 9 shows a table of the grey scale values for the four sums ($X_1$, $X_2$, $X_3$ and $X_4$) and the associated decision. For example, $X_1$ equal to 1000. Likewise $X_2$ equal to 0101 and so on. When the values are compared against the table of FIG. 5, it is determined that $X_1$ is black, $X_2$ is black, $X_3$ is black and $X_4$ is white. FIG. 8B shows that the bit of interest which was transferred with half black and half white, is reproduced as a bit approximately ¾ black and ¼ white.

FIGS. 10A and 10B show another angle and edge example: In the example, PEL 46 is between 50% and 75% reflectance. The grey scale value code which is assigned to each PEL is recorded in each of the squares of FIG. 10A. FIG. 11 shows a table of the grey scale values for the four sums ($X_1$, $X_2$, $X_3$ and $X_4$) and the associated decision, namely: B, W, B, W. The associated decisions are determined by comparing the values calculated for $X_1$, $X_2$, $X_3$ and $X_4$ against the threshold table of FIG. 5.

Based upon the above examples, it is clear that a PEL which is reproduced in accordance with the present invention has a finer detail than when the same PEL was scanned.

Referring again to FIG. 1, after a PEL is given one of the possible four grey scale code values by grey scale encoder 16, the grey scale code value is transmitted over conductors 30 through switching means 50 to a storage means 32.

In the preferred embodiment of the present invention, the grey scale encoder, hereinafter called the encoding means, is a conventional multibit A/D converter. Only the two most significant bits of the encoding means are used. The encoding means also converts the data from analog to digital form. The switching means 50 includes at least one set of two-way switches or ping pong switches 52 and 54, respectively. As will be explained hereinafter, each of the two position switches alternately loads grey scale values into one of the alternate memories of storage means 32.

The memories are arranged in an alternate configuration. For example, when the contents of alternate memory 58 are shifted out, the two-position switch 52 is interconnected to alternate memory 56. In other words, when memory 58 is unloading memory 56 is loading. Similarly when memory 62 is unloading, memory 60 is loading.

The alternate configuration allows a significant increase in data throughput of the system. The alternate configuration of the memory further allows the system to reproduce a copy having the same resolution as the resolution at which an original document is scanned. To effectuate a 1:1 resolution, only the most significant bit (MSB) of the grey scale code which is loaded into either alternate memory 56 or alternate memory 58 is shifted out for transmission. On the other hand, when the system is operating as a scan-coarse/print-fine system, the least significant bit (LSB) of the two bit grey scale code is shifted out for transmission.

The grey scale codes are then shifted through switching means 64 and data selector 66 into modem 68. Switching means 64 is identical to the previously described switching means 50. This being the case, description of switching means 64 will not be fully given. Suffice it to say that switching means 64 include a pair of two position switches 70 and 72, respectively. Each of the two position switches may transfer data from either one of its associated alternate memories. By way of example, switch 70 can transfer data from alternate memories 56 and 58. Likewise switch 72 can transfer data from alternate memories 60 and 62. Selection of data from the alternate memories are controlled by data selector 66. The data selector is a conventional two position data selector which operates so that data is selected from any of the alternate memories. The data is then transferred over conductors 74 or 76 and 78, respectively, to the modem 68. The modem is a conventional module which may be purchased off the shelf. By way of example, the Bell 208 Modem (manufactured by Western Electric) is acceptable. The function of the modem is to encode the grey scale data so that it can be conveyed over the transmission channel.

A controller 80 controls the operation of the above described components, all of which are located in the transmitter. In the preferred embodiment of the invention, the controller includes a plurality of clock circuits. Each clock circuit generates a clock which controls one of the components. By way of example, the clock on conductor 82 is a 1× clock (CLK). The 1× clock controls the scanner, the A/D converter and the shift registers. Its function is to ensure that data is scanned coarse. Similarly, the clock on conductor 84 is a 2× clock (CLK). The 2× clock controls the data selector. Its function is to ensure that data is transferred at twice the rate at which it was scanned. The controller is enabled by a synchronizing pulse outputted from the modem 68 on conductor 86.

Still referring to FIG. 1, the receiver portion of the image processing system will now be described. The grey scale data which is transferred over the transmission channel is received by modem 88. Modem 88 is a conventional off-the-shelf item similar to modem 68. This being the case, the detail of modem 88 will not be described. Suffice it to say that modem 88 receives the encoded grey scale data, decodes the same and outputs a serial stream of data on conductor 90. Modem 88 also generates an enabling signal on conductor 92. The enabling signal on conductor 92 synchronizes the receiver controller 94 with the incoming data. In the preferred embodiment of the present invention the receiver controller is a plurality of clock circuits each of which generates a clock on conductors 96, 98 and 100 for controlling a plurality of devices at the receiver. Each of the devices will be described subsequently. As grey scale data is streamed out of modem 88, it is conveyed by conductor 90 into memory means 102. The data from memory means 102 is extracted by data selector 104 to arithmetic and logic unit 106. The data selected by data selector 104 is conveyed over conductors A and B to the arithmetic and logic unit. Data selector 104, together with the arithmetic and logic unit 106, perform the necessary mathematical calculations depicted by the above referenced algorithm to generate the values for $X_1$, $X_2$, $X_3$ and $X_4$ (see FIG. 4). As $X_1$ or $X_2$ or $X_3$ or $X_4$ is calculated sequentially, the values are stored in latch means 108. Intermediate sums are fed back over conductor 110 into data selector 104. The values for $X_1$ or $X_2$ or $X_3$ or $X_4$ are sequentially outputted on conductor 112. The value on conductor 112 is fed into data selector and comparter means 114. The data selector and comparter storage means 114 pulls data line by line from read only storage means 116. By comparing the information extracted from read only storage means 116 with the value on conductor 112, a decision is made as to whether $X_1$, $X_2$, $X_3$ and/or $X_4$ is a black or white PEL. The contents of read only storage means 116 are generated from the data shown in FIG. 5. Once the decision is made by the data selector and comparison means, the decision which may be a zero or one, relative to $X_1$ and $X_2$, is fed into memory means 118 over conductor 120. Likewise the decision for $X_3$ and $X_4$ is fed into memory means 122 over conductor 124. The output from the memory is transferred over conductors 128 and 130 to a printing mechanism (not shown).

In the preferred embodiment of the invention, memory means 102 is a two line shift register type memory. Data into the memory is shifted in a right to left position. Line 132 of the two line memory stores old data while line 134 stores current data. By selectively tapping the appropriate shift register stages and controlling the shifting of data with a 1× clock, the data selector 104 will transfer previously stored data from conductor lines Y, X, V, W and Z, respectively, to the ALU. By way of example, the Y conductor line will transfer the Y PEL (see FIG. 6A). Likewise, the X, V and W PELs are transferred over the X, V and W conductor. The Z PEL is the current PEL which is being shifted into the shift register. In order to control the rate at which data is selected by the data selector 104 and the rate at which the ALU calculates data to determine the values of $X_1$, $X_2$, $X_3$ and $X_4$, the data selector is controlled by a 4× clock while the ALU is controlled by an 8× clock.

An alternate approach to calculate the values for $X_1$, $X_2$, $X_3$ and $X_4$ respectively, would be to use a microcomputer. The microcomputer includes an ALU unit and a memory together with an instruction set. The programming of the microcomputer to calculate the values of $X_1$, $X_2$, $X_3$ and $X_4$ in accordance with the above-stated summing expressions are within the skill of the art and therefore will not be described in detail.

In still an alternate embodiment of the invention, instead of transferring the grey scale data over the transmission channel and computing the values for $X_1$, $X_2$, $X_3$ and $X_4$ in the receiver, the calculation can be done at the transmitter and the print/no-print decision "0" or "1" is transmitted over the transmission channel.

What is claimed is:

1. Image processing device for transforming coarse scan information into fine scan information comprising:
    means for encoding the coarse scan information into grey level information;
    logic means for combining the grey level information from a coarse PEL of interest and its adjoining surrounding coarse PELs; and
    conversion means operable to convert a combined grey level information into a fine PEL of black/white information.

2. Device for increasing the resolution characteristic of an image processing apparatus, said device comprising:
    an encoding means for coding PELs according to the reflectance characteristics of said PELs;
    logic means for summing the codes assigned to a PEL of interest with the codes assigned to adjacent PELs lying on a pair of perpendicular lines intersecting said PEL of interest; and
    conversion means operable to accept each sum from the logic means and to convert said sum into a PEL with a spacial resolution higher than the spacial resolution at which the PEL is being scanned.

3. In an image processing apparatus wherein an original document is coarsely scanned at a first resolution, digitized and transmitted to a reproducing device for finely printing a copy of said document, a device for enhancing the quality of the finely printed copy, said device comprising:
    encoding means for assigning a code to a coarsely scanned PEL, said code being in accordance with a grey scale area in which the PEL falls;
    arithmetic means for summing the codes assigned to PELs adjacent to a PEL of interest; and
    means for comparing the sums with a predetermined scale and to generate a fine print.

4. The apparatus claim in claim 3 further including means for storing the summed code.

5. Apparatus for scanning a document at a first resolution R and printing said document at a second resolution nR, n being an integer greater than one, said apparatus comprising:
    means for scanning said document and for generating a series of PELs indicative of the information contents of said document;
    means for encoding said PELs with a code indicative of the grey scale value of said PELs; and
    logic means for generating a print code, said print code including at least two sums of groups of scan codes with each group of scan codes including a first value for a PEL of interest and the values of scan codes for adjoining PELs.

6. The apparatus as claimed in claim 5 further including conversion means for accepting the print code and correlating the same with a predetermined scale to generate a print/no-print signal.

7. The apparatus of claim 6 further including a reproducing device to accept the print/no-print signal and to reproduce a copy of the scanned document.

8. The apparatus of claim 5 wherein the encoding means is a multi-bit A/D converter.

9. A process for fine printing a document from coarsely scanned data comprising the following steps:
    encoding the coarsely scanned data in accordance with a grey scale value;
    summing the grey scale values of a PEL of interest with the grey scale values of adjoining PEL; and
    correcting the summed grey scale value with a predetermined reference to generate a print/no-print signal.

10. The process of claim 9 wherein the adjoining PELs to be summed are being positioned on a pair of perpendicular lines intersecting at the PEL of interest.

11. A method for reproducing a copy of a scanned document comprising the following steps:
    scanning the document at a first resolution X to generate a plurality of PELs;
    encoding each PEL with a grey scale code indicative of a grey scale value of said PEL;
    generating a plurality of print PELs with each print PEL having a second resolution 4X and an encoded value $X_1 = X + V + W$ $X_2 = X + W + Y$ $X_3 = X + V + Z$ $X_4 = X + Y + Z$ where $X_1$, $X_2$, $X_3$ and $X_4$ are sub PELs of the print PEL, X is the grey scale code assigned to the scan PEL of interest and V, W, Y and Z are grey scale codes assigned to PELs adjoining the sub PELs.

12. The method of claim 9 wherein the print PEL is being generated by summing the encoded scan PELs value.

13. The method of claim 9 further including the step of correlating the value for the summed print PELs with a predetermined scale to generate a print/no-print signal.

14. A method for printing a document comprising of the following steps:
   scanning the document at a resolution $X$ to generate a plurality of electrical signals indicative of the document;
   processing the electrical signals at a $2X$ resolution; and
   reproducing the document at a $4X$ resolution.

15. The method of claim 14 wherein the processing step includes the step of transmitting the electrical signals.

16. Device for reproducing a document comprising:
   scanner means for scanning the document and reproducing a plurality of electrical signals indicative of the information contents of said document;
   means for encoding the electrical signals in accordance with predetermined grey scale value codes;
   means for storing the grey scale value code; and
   calculating means for accessing the stored grey scale value codes and to generate a print/no-print signal therefrom.

* * * * *

UNITED STATES PATENT AND TRADEMARK OFFICE
CERTIFICATE OF CORRECTION

PATENT NO. : 4,280,144

DATED : July 21, 1981

INVENTOR(S) : James L. Bacon

It is certified that error appears in the above-identified patent and that said Letters Patent are hereby corrected as shown below:

Column 3, line 19, delete "fails" and insert --falls--.
Column 5, line 12, delete "adjoiningg" and insert --adjoining--.
Column 6, line 31, delete "aboove" and insert --above--.

Signed and Sealed this

Tenth Day of November 1981

[SEAL]

Attest:

Attesting Officer

GERALD J. MOSSINGHOFF

Commissioner of Patents and Trademarks